June 3, 1969        I. FERNLUND        3,447,841

DYNAMIC/STATIC SLIDING BEARING

Filed May 29, 1967

INVENTOR:
INGEMAR FERNLUND

Howson & Howson

ATTYS.

United States Patent Office 3,447,841
Patented June 3, 1969

3,447,841
DYNAMIC/STATIC SLIDING BEARING
Ingemar Fernlund, Hindas, Sweden, assignor to SKF Industries, Inc., King of Prussia, Pa., a corporation of Delaware
Filed May 29, 1967, Ser. No. 641,904
Claims priority, application Sweden, June 3, 1966, 7,596/66
Int. Cl. F16c 7/04, 35/00, 17/00
U.S. Cl. 308—9                    4 Claims

ABSTRACT OF THE DISCLOSURE

A sliding bearing capable of withstanding thrust and radial loads comprising a stationary member and a rotatable member adapted for relative sliding movement having coacting confronting sliding surfaces between which a pressure medium such as a lubricant is introduced. At least one of the sliding surfaces of one member is formed with shallow grooves arranged in a manner so that upon relative rotation of the sliding surfaces, the fluid pressure medium is pumped toward the central transverse plane of the bearing creating a pressure supporting the members to bear the load in a satisfactory manner.

---

The present invention relates to a dynamic/static sliding bearing for carrying both thrust and radial loads and comprises a stationary and a rotatable member between the relative sliding surfaces of which a pressure medium is introduced, one or both of the said sliding surfaces having a number of equally spaced shallow grooves.

Sliding bearings having a film of pressure medium acting between the sliding surfaces and having grooves in one of the said surfaces have been proposed earlier. The pressure medium may be a gas, a liquid or a suitable lubricant. Bearings of this kind may work on the hydrostatic principle, i.e., a pressure medium is introduced into the bearing from any suitable external source of pressure or according to the hydrodynamic principle in which a load carrying film is created between the sliding surfaces through relative rotation between the sliding surfaces of the members forming the bearing. In both these types of bearing it is desired to create a load carrying film between the sliding surfaces. The bearing according to the invention works on the principle that a pressure medium is pumped into a pressure zone between the surfaces with the aid of the grooves in the sliding surfaces. Bearings of this general type have been proposed in the form of flat, spherical or conical thrust end bearings. In all these cases, however, the pumping grooves have had the form of simple helical or spiral grooves and have thus been able to pump pressure medium in one direction only. The grooves have often been made so that the central line of each groove has formed a portion of a spiral.

Bearings made in this manner have been used with satisfactory results but have suffered from the disadvantage that their field of use is limited because they are most suitable for use as closed end bearings.

In order to provide a bearing for use with a shaft passing through the housing the invention consists of a dynamic/static sliding bearing which is characterized mainly thereby that the co-acting surfaces are conical or substantially spherical and that the grooves in one or both of the sliding surfaces of said members are disposed so that they form a pattern in the sliding surface or sliding surfaces comprising two series of helical grooves, one on each side of a central transverse plane of the bearing, one of the said series having a right hand twist and the other a left hand twist.

The invention is described in the following with reference to the accompanying drawing, in which.

Figure 1:
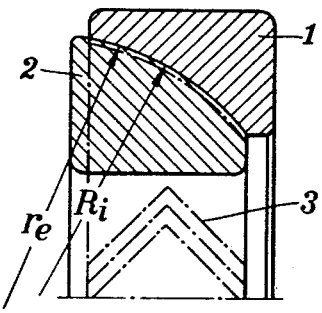
FIG. 1 shows a sliding bearing having substantially spherical sliding surfaces.

The bearing shown in FIG. 1 comprises a stationary bearing member 1 and a rotatable inner member 2. The sliding surface of the outer bearing member is a zone of a sphere and that of the inner member is a toroid as is apparent from the figure, in which $R_i$ and $r_e$ are the radii of curvature of the profiles of the inner and outer members respectively. By forming the sliding surfaces in this manner, it is possible to concentrate the pressure zone near the central plane of the bearing and thus avoid disadvantageous edge loading of the bearing. In the bearing shown, the grooves 3 for pumping the pressure medium have been formed in the inner bearing member, these grooves comprising, as shown, two series of helical grooves disposed one on each side of the central plane P of the bearing and together forming what may be termed a herringbone pattern. The series of grooves have a left hand and a right hand twist respectively and extend across the whole of the active portion of the sliding surface of the inner ring. During rotation of the bearing, the pressure medium, because of the above-described form of the grooves, will be pumped from the outer edges of the bearing towards its middle. If a suitable kind of lubricant is introduced between the sliding surfaces before the bearing is assembled, a pressure will be created between the sliding surfaces upon relative rotation thereof whereby the desired film of pressure medium is obtained and will be maintained in the bearing during rotation and carry the load in a satisfactory manner.

When the bearing is stationary, part of the lubricant will be forced out to its edges. The bearing will, however, be practically self-supporting as regards lubricant. If required, a reserve supply of lubricant may easily be provided at the outer edges of the bearing. The bearing will function as effectively if it is supplied with a liquid or a gas instead of lubricant. The bearing can be mounted to carry either a horizontal or a vertical shaft, and since the sliding surfaces are in effect spherical, it will be self-aligning.

Figure 2:
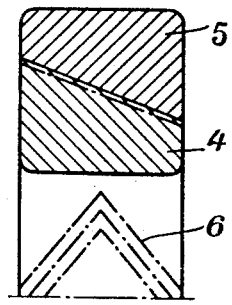
FIG. 2 shows a bearing with conical sliding surfaces.

FIG. 2 shows a similar bearing having an inner member 4 and an outer member 5, there being grooves similar to those of FIG. 1 in the first-mentioned member. In this case, however, the co-acting surfaces are conical, which in certain cases depending on the type of mounting, may have some advantages as compared with the form of bearing shown in FIG. 1. The bearing functions similarly to that described.

Figure 3:
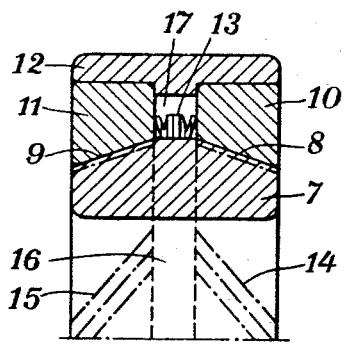
FIG. 3 shows a bearing in which one of the bearing members has conical surfaces sloping in opposite directions and in which the other member is split in a transverse plane; i.e., a plane perpendicular to the axis of the bearing, each half having a conical surface conforming to one of the conical surfaces of the other bearing member, the said bearing also having a special sealing member.

FIG. 3 shows a bearing differing in design from those shown in the figures described above. It comprises an inner member 7 having two conical surfaces 8 and 9. A transversely split outer member 10, 11 is provided with internal conical surfaces corresponding to and co-acting with the sliding surfaces 8, 9. To hold the split outer member together and retain the various members of the bearing in assembled position an outer ring 12 surrounding the periphery of the outer bearing member is provided.

Two series of helical grooves 14, 15 are provided in the inner member 7 extending across the width of the conical surfaces. Between these series of grooves and in the vicinity of the central transverse plane of the bearing is a smooth cylindrical zone 16 of the same width as the space 17 formed between the halves 10 and 11 of the outer member. A sealing member 13 is disposed within this space. As shown in the figure this sealing member may consist of a double-acting lip seal, but any other suitable form of sealing member may be used. The bearing functions as follows. As in the previously described forms, pressure medium is pumped by the helical grooves from the outer edges of the bearing towards its middle. Since, as above mentioned, the grooves extend to the inner ends of the outer halves 10, 11 a pressure will be created in the space 17. When a unidirectional thrust is exerted on the bearing, the grooves in the loaded half of the bearing will pump more effectively than those in the opposite half. To prevent leakage of pressure medium through the unloaded half of the bearing which would otherwise jeopardize the film in the loaded half, the above-mentioned sealing member 13 has been applied in the space 17 to seal against the sides of the bearing member halves.

Figure 4:
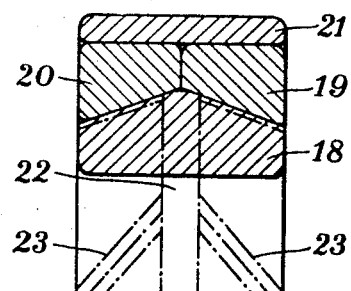
FIG. 4 shows a similar bearing, but with another type of sealing member.

FIG. 4 shows another example of a sliding bearing according to the invention somewhat similar in form to that described in connection with FIG. 3.

In this case also, the bearing consists of an inner member 18 and a split outer member comprising two halves 19 and 20. An outer ring 21 surrounding the two halves of the outer member is provided to maintain the bearing in assembled relationship. In this form, however, the outer member is formed and assembled so that there is no space between the two halves. However, in order to provide a seal at the middle of the bearing the inner member has been provided with a plain zone, i.e. a zone in which there are no grooves since the grooves do not extend across the whole width of the conical sliding surfaces. The groove pattern comprises two series of helical grooves of opposite twist which end at a suitable distance at each side of the contact plane of the halves of the outer member. When the bearing rotates, pressure medium will be pumped towards the plain zone 22 at the middle of the bearing where pressure will be created. When the bearing is subjected to unidirectional thrust, the plain zone will serve to prevent leakage of pressure medium at the middle of the bearing.

Figure 5:
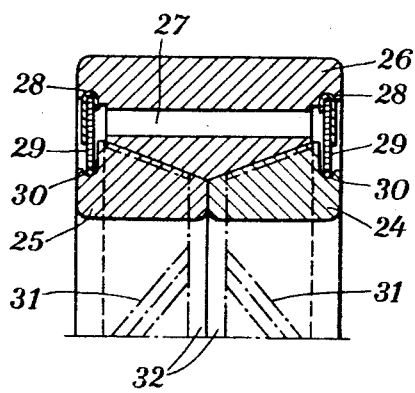
FIG. 5 shows another form of double conical bearing.

FIG. 5 finally shows a bearing which differs somewhat in design from the last two described above. In this case the bearing has a split inner member comprising two halves, 24, 25 while the outer member 26, on the other hand is a single piece. In this form, also the co-acting sliding surfaces are conical. The outer member is provided with a number of holes 27 extending from side to side adjacent its sliding surfaces. The outer member also has near its sides, grooves 28 in which are inserted sealing plates 29. The sealing plates extend radially inwards into grooves in the respective halves 24 and 25 of the inner member. These halves are also provided with helical grooves 31 ending short of the plane of contact between the halves to form plain zones 32. This bearing functions as follows. The pressure medium within the sealing plates 29 will be pumped by the grooves towards the middle of the bearing. If the bearing is subjected to thrust in one direction, the pumping effect of the grooves at the loaded side will be increased.

The plain zones serve as a seal and to a certain extent prevent pressure medium from escaping to the other side of the bearing. The holes 27 eliminate the risk of deficiency of lubricant at the loaded side of the bearing. Any pressure fluid which may be pressed out at the unloaded side of the bearing will be returned through these holes to the other side of the bearing whereby a satisfactory supply of pressure medium to the loaded side will be ensured.

The invention is in no way limited to the forms shown, but may be varied in many ways within the scope of the following claims. The grooves may be of a depth suited to the pressure medium chosen with respect to the load and other running conditions pertaining. The grooves may be made by etching them or by any other suitable method. The use of the bearing is not limited to any special technical field, but the bearing may be used in different kinds of machines where it is desired to have a bearing which may be cheaply made and which is dependable during running.

I claim:

1. A dynamic/static sliding bearing for carrying both thrust and radial loads comprising a stationary member and a rotatable member adapted for relative rotation about an axis of rotation, said members having co-acting confronting sliding surfaces between which a fluid pressure medium is introduced, means defining a plurality of shallow grooves in at least one of said sliding surfaces arranged so that upon relative rotation of the members the fluid medium is pumped toward a plane transverse to the axis of rotation and disposed between the circumferential edges of the co-acting sliding surfaces, one of said co-acting sliding surfaces being spherical and the other being a toroid, the relative curvature of said surfaces being such that the load zone is centered in said transverse plane.

2. A sliding bearing as claimed in claim 1 wherein the grooves form a herringbone pattern.

3. A sliding bearing as claimed in claim 1 wherein the radius of curvature of said one sliding surface is greater than the radius of curvature of said other sliding surface whereby the sliding surfaces are non-parallel.

4. A sliding bearing as claimed in claim 3 wherein the centers of radii of curvature of said sliding surfaces are located in a plane outside of the planes through the circumferential edges of the co-acting sliding surfaces.

References Cited

UNITED STATES PATENTS

| 1,215,374 | 2/1917 | Holmgren | 308—70 |
| 2,047,885 | 7/1936 | Riebe | 308—72 |
| 2,229,237 | 1/1941 | Brenkert | 308—122 |
| 3,210,044 | 10/1965 | Mori | 308—9 |
| 3,282,633 | 11/1966 | Moors. | |
| 3,376,083 | 4/1968 | Muijderman | 308—9 |
| 2,986,096 | 5/1961 | Booth et al. | 308—122 |

FOREIGN PATENTS

| 864,786 | 1/1953 | Germany. |

MARTIN P. SCHWADRON, Primary Examiner.

FRANK SUSKO, Assistant Examiner.

U.S. Cl. X.R.

308—121